United States Patent
Mavuri et al.

(10) Patent No.: US 10,907,545 B2
(45) Date of Patent: Feb. 2, 2021

(54) COOLING SYSTEM FOR A TURBINE ENGINE

(71) Applicant: General Electric Company, Schenectady, NY (US)

(72) Inventors: Rajesh Mavuri, Karnataka (IN); Debabrata Mukhopadhyay, Karnataka (IN)

(73) Assignee: General Electric Company, Schenectady, NY (US)

( * ) Notice: Subject to any disclaimer, the term of this patent is extended or adjusted under 35 U.S.C. 154(b) by 264 days.

(21) Appl. No.: 15/985,737

(22) Filed: May 22, 2018

(65) Prior Publication Data
US 2018/0371999 A1  Dec. 27, 2018

(30) Foreign Application Priority Data

Jun. 27, 2017  (IN) .............................. 201741022514

(51) Int. Cl.
| | |
|---|---|
| F02C 7/141 | (2006.01) |
| F04D 29/58 | (2006.01) |
| F02C 7/18 | (2006.01) |
| F02C 6/08 | (2006.01) |
| F04D 29/32 | (2006.01) |
| F01D 5/08 | (2006.01) |
| F01D 25/12 | (2006.01) |

(52) U.S. Cl.
CPC .............. *F02C 7/141* (2013.01); *F01D 5/085* (2013.01); *F01D 25/12* (2013.01); *F02C 6/08* (2013.01); *F02C 7/18* (2013.01); *F02C 7/185* (2013.01); *F04D 29/321* (2013.01); *F04D 29/5846* (2013.01); *F05D 2260/207* (2013.01); *F05D 2260/212* (2013.01); *F05D 2270/313* (2013.01)

(58) Field of Classification Search
CPC .. F02C 7/141; F02C 7/185; F02C 7/18; F02C 6/08; F01D 5/082; F01D 5/085; F01D 5/081
USPC ......................................................... 416/116
See application file for complete search history.

(56) References Cited

U.S. PATENT DOCUMENTS

| | | | | |
|---|---|---|---|---|
| 3,034,298 A | * | 5/1962 | White ..................... | F01D 11/10 60/726 |
| 3,647,313 A | | 3/1972 | Koff | |
| 4,573,324 A | | 3/1986 | Tischer et al. | |
| 4,991,391 A | * | 2/1991 | Kosinski .................. | F01D 5/08 60/39.182 |
| 5,297,386 A | * | 3/1994 | Kervistin .............. | F04D 27/023 60/226.1 |

(Continued)

*Primary Examiner* — Ted Kim
(74) *Attorney, Agent, or Firm* — Charlotte C. Wilson; James W. Pemrick (57) ABSTRACT

A cooling system for a turbine engine is provided. The turbine engine includes a compressor, a compressor discharge chamber (CDC), a combustor assembly, and a turbine coupled in a serial flow relationship such that a first portion of air from the CDC is channeled to the combustor assembly. The turbine is coupled to the compressor via a rotor. The cooling system includes an air duct configured to channel a second portion of air from the CDC to a mid-rotor region of the rotor, and a fluid supply system coupled to the air duct at a coupling. The fluid supply system is configured to channel a flow of fluid to the coupling. The coupling is configured to cool the second portion of CDC air via absorption of heat by the fluid from the second portion of CDC air.

14 Claims, 4 Drawing Sheets

(56) References Cited

U.S. PATENT DOCUMENTS

| | | | |
|---|---|---|---|
| 5,480,298 A * | 1/1996 | Brown | F01D 21/003 |
| | | | 431/79 |
| 5,685,158 A | 11/1997 | Lenahan et al. | |
| 5,853,285 A | 12/1998 | Miller et al. | |
| 6,612,114 B1 * | 9/2003 | Klingels | F01D 5/187 |
| | | | 415/115 |
| 7,993,102 B2 | 8/2011 | Desai et al. | |
| 8,192,141 B1 | 6/2012 | Dale | |
| 2010/0178168 A1 | 7/2010 | Desai et al. | |
| 2011/0088405 A1 * | 4/2011 | Turco | F01D 5/081 |
| | | | 60/782 |
| 2014/0208768 A1 * | 7/2014 | Bacic | F02C 7/185 |
| | | | 60/782 |
| 2016/0123327 A1 | 5/2016 | Collins et al. | |
| 2017/0037782 A1 * | 2/2017 | Schwarz | F02C 7/18 |
| 2017/0089263 A1 * | 3/2017 | Clegg | F01D 25/08 |
| 2017/0101933 A1 * | 4/2017 | Mukhopadhyay | F01D 11/24 |
| 2018/0112604 A1 * | 4/2018 | Akiyama | F02C 3/24 |

* cited by examiner

COOLING SYSTEM FOR A TURBINE ENGINE

BACKGROUND

The present disclosure relates generally to turbine engines and, more specifically, to systems and methods for cooling a mid-portion of a rotor assembly of a turbine engine.

At least some known turbine engines include a compressor, a combustor, and a turbine coupled together in a serial flow relationship. More specifically, ambient air enters the compressor. Compressed air is discharged from the compressor, mixed with fuel, and ignited in the combustor to form a high energy gas stream. The high energy gas stream flows through the turbine to rotatably drive the turbine. The compressor and turbine are coupled through a shaft to form a rotor assembly, such that rotation of the turbine drives the compressor and a load coupled to the shaft.

A performance of at least some known turbine engines is limited at least in part by a temperature limit of components along a mid-portion of the rotor assembly, near the compressor discharge. For example, during conditions of relatively high ambient temperature, a temperature increase of air through the compressor may cause the discharge temperature to exceed the temperature limit of the mid-portion components, requiring the turbine engine to be operated at less than full load to stay within the temperature limit. At least some known turbine engines route cooling air to the mid-portion of the rotor assembly to decrease a temperature of components in the mid-portion. However, such known cooling schemes require additional bleed air from an intermediate stage of the compressor, which reduces an efficiency of the turbine engine, and/or require routing the air to be used for cooling through an external heat exchanger skid to achieve a suitable initial temperature, which increases a footprint of the turbine engine, increases flow losses, and increases a manufacturing and maintenance complexity and cost of the turbine engine.

BRIEF DESCRIPTION

In one aspect, a cooling system for a turbine engine is provided. The turbine engine includes a compressor, a compressor discharge chamber (CDC), a combustor assembly, and a turbine coupled in a serial flow relationship such that a first portion of air from the CDC is channeled to the combustor assembly. The turbine is coupled to the compressor via a rotor. The cooling system includes an air duct configured to channel a second portion of air from the CDC to a mid-rotor region of the rotor, and a fluid supply system coupled to the air duct at a coupling. The fluid supply system is configured to channel a flow of fluid to the coupling. The coupling is configured to cool the second portion of CDC air via absorption of heat by the fluid from the second portion of CDC air.

In another aspect, a turbine engine assembly is provided. The turbine engine assembly includes a compressor, a compressor discharge chamber (CDC), a combustor assembly, and a turbine coupled in a serial flow relationship such that a first portion of air from the CDC is channeled to the combustor assembly. The turbine is coupled to the compressor via a rotor. The turbine engine assembly also includes an air duct that includes a first segment and a second segment. The first segment is configured to channel a second portion of air from the CDC to the second segment. The turbine engine assembly further includes a fluid supply system coupled to the first segment at a coupling. The fluid supply system is configured to channel a flow of fluid to the coupling, and the coupling is configured to cool the second portion of CDC air via absorption of heat by the fluid from the second portion of CDC air. The second segment is configured to channel the cooled second portion of CDC air to a mid-rotor region of the rotor.

DETAILED DESCRIPTION

The embodiments described herein include a cooling system for components in and adjacent to a mid-rotor region of a turbine engine. The embodiments include an air duct configured to receive compressor discharge air. A fluid is channeled to a coupling on the air duct to reduce a temperature of the compressor discharge air via absorption of heat by the fluid from the compressor discharge air. The air duct channels the cooled compressor discharge air to a mid-rotor region of the rotor. In some embodiments, a path length of the air duct is sufficiently short, and the fluid supply system and coupling are sufficiently compact, such that routing of the compressor discharge air to a large-footprint heat exchange system on a separate skid is not required, thereby reducing a cost and footprint, and increasing an operating efficiency, of the turbine engine as compared to at least some known turbine engine assemblies.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
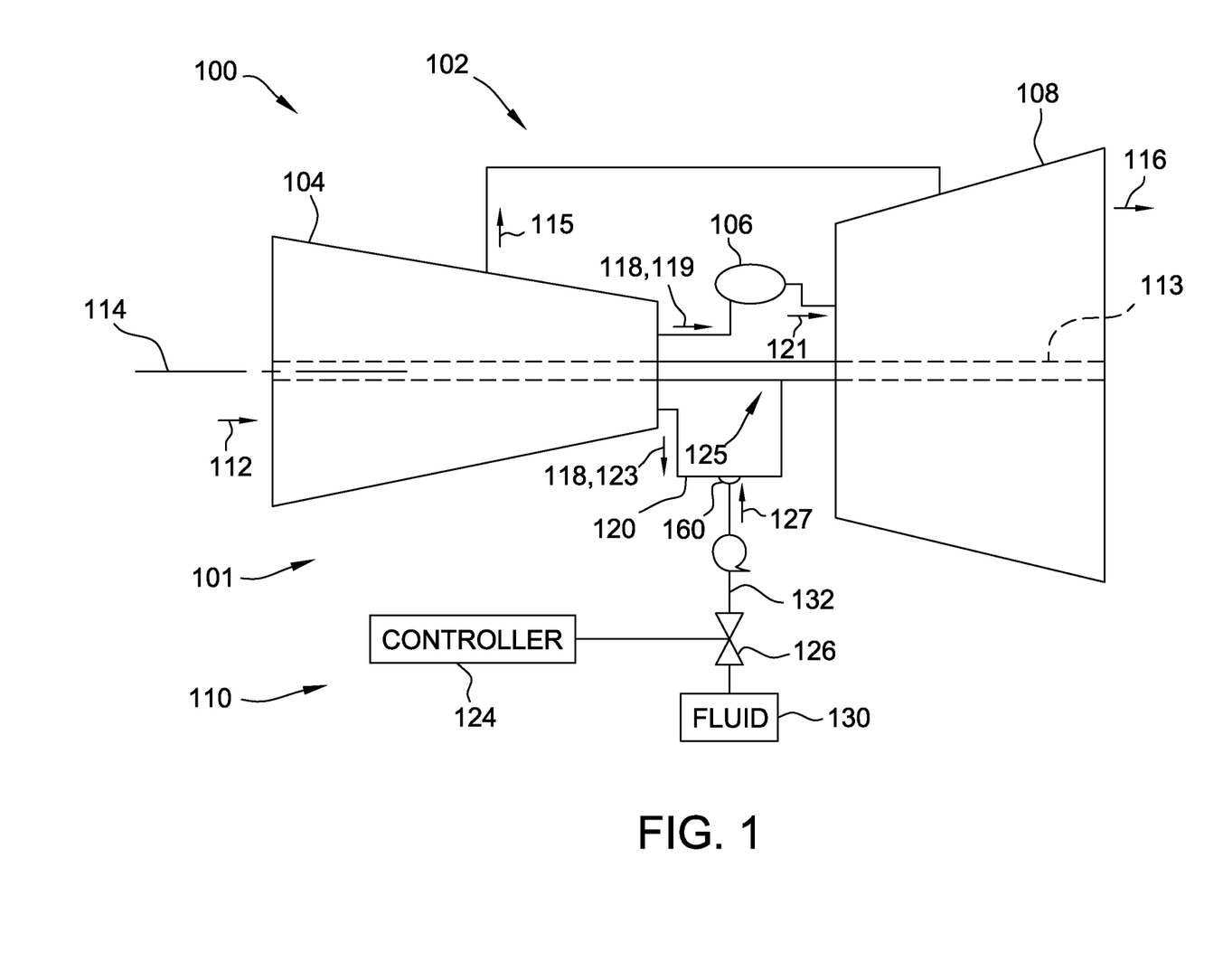
FIG. 1 is a schematic illustration of a turbine engine assembly.

FIG. 1 is a schematic illustration of an exemplary turbine engine assembly 100. In the exemplary embodiment, turbine engine assembly 100 includes a turbine engine 102 that includes a compressor 104, a combustor assembly 106, and a turbine 108 coupled in serial flow relationship. More specifically, combustor assembly 106 is positioned downstream from compressor 104, and turbine 108 positioned downstream from combustor assembly 106. Turbine 108 is coupled to compressor 104 via a rotor 113, which defines a centerline axis 114 of turbine engine 102. In the exemplary embodiment, turbine engine 102 is a gas turbine engine. Alternatively, turbine engine 102 is any other turbine engine and/or rotary machine, including, without limitation, a steam turbine engine, aircraft engine, or a wind turbine.

In operation, a flow of intake air 112 is channeled through compressor 104. In some embodiments, at least a portion of flow through compressor 104 is extracted, upstream from a final stage of compressor 104, as compressor bleed air 115. For example, compressor bleed air 115 is channeled towards turbine 108 to provide thermal management for turbine casings and hot gas path components therein. In alternative embodiments, compressor bleed air 115 is not extracted.

Figure 5:
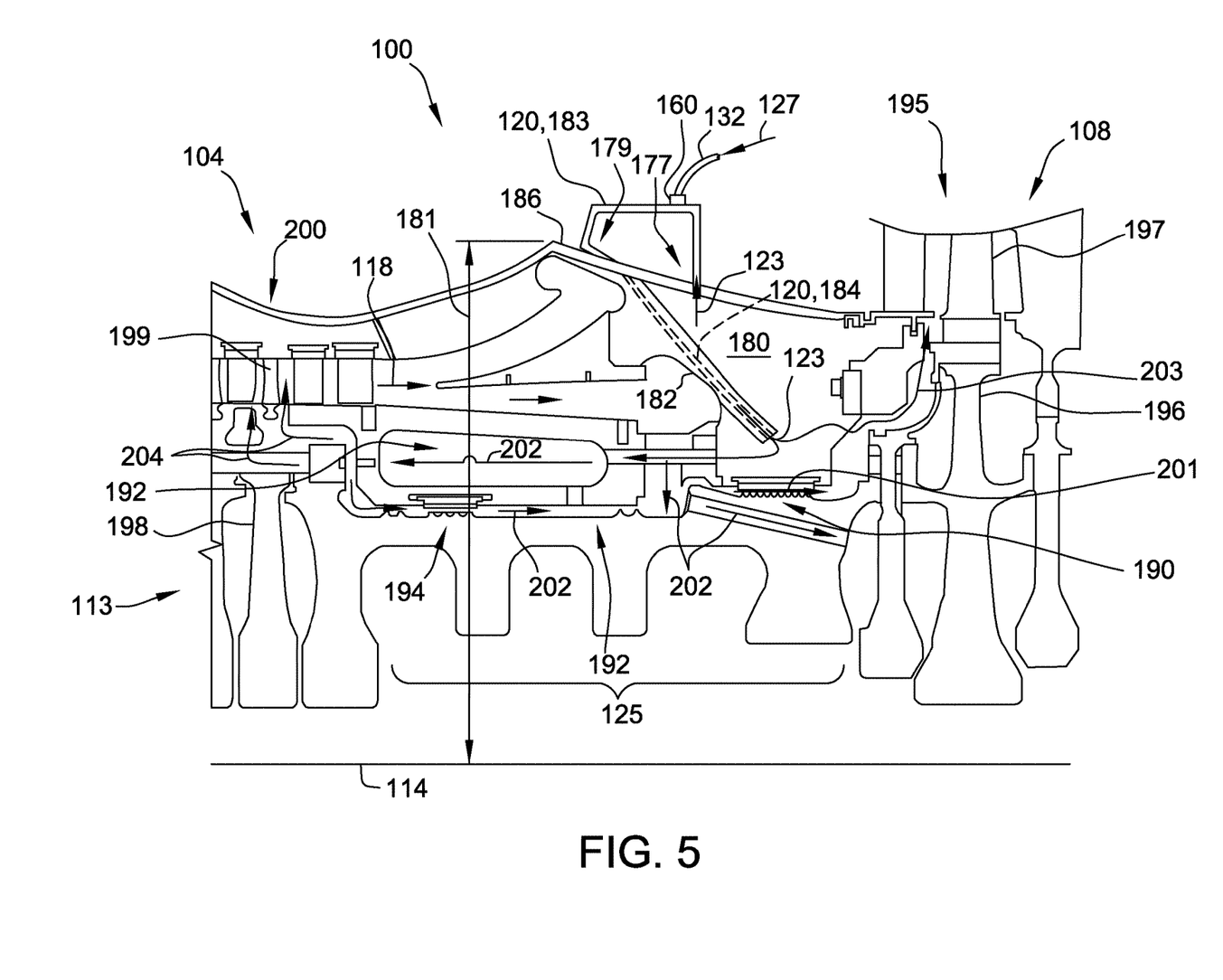
FIG. 5 is a cross-sectional view of a portion of the turbine engine assembly shown in FIG. 1, illustrating an exemplary mid-rotor region.

At least a portion of the flow through compressor 104 is discharged from the final stage of compressor 104 into a compressor discharge chamber (CDC) 180 (shown in FIG. 5). The air discharged into CDC 180 is designated as CDC air 118. A first portion 119 of CDC air 118 is channeled to combustor assembly 106, wherein first portion 119 is mixed with fuel and combusted to form a flow of combusted gas 121. Flow of combusted gas 121 is discharged towards turbine 108 to facilitate imparting a rotational force on turbine 108 and rotor 113. Rotor 113 drives compressor 104 and a load (not shown), such as an electrical generator for supplying a power grid, or a mechanical load. Flow of combusted gas 121 channeled through turbine 108 is then discharged as a flow of exhaust gas 116.

A second portion 123 of CDC air 118 is routed through a cooling system 101. In the exemplary embodiment, cooling system 101 includes an air duct 120 configured to channel second portion 123 of CDC air 118 to a mid-rotor region 125 of rotor 113, and a fluid supply system 110 coupled to air duct 120 at a coupling 160. More specifically, fluid supply system 110 channels a flow of fluid 127 to coupling 160. Coupling 160 is configured to cool second portion 123 of CDC air 118 via absorption of heat by fluid 127 from second portion 123 of CDC air 118.

For example, in the exemplary embodiment, fluid supply system 110 includes a supply line 132 in flow communication with coupling 160. Supply line 132 also is in flow communication with a fluid source 130 that supplies fluid 127. A valve 126 is operatively coupled to supply line 132. Fluid supply system 110 includes a controller 124 coupled in communication with valve 126, and operable to control the flow of fluid 127 to coupling 160 via operation of valve 126.

Figure 2:
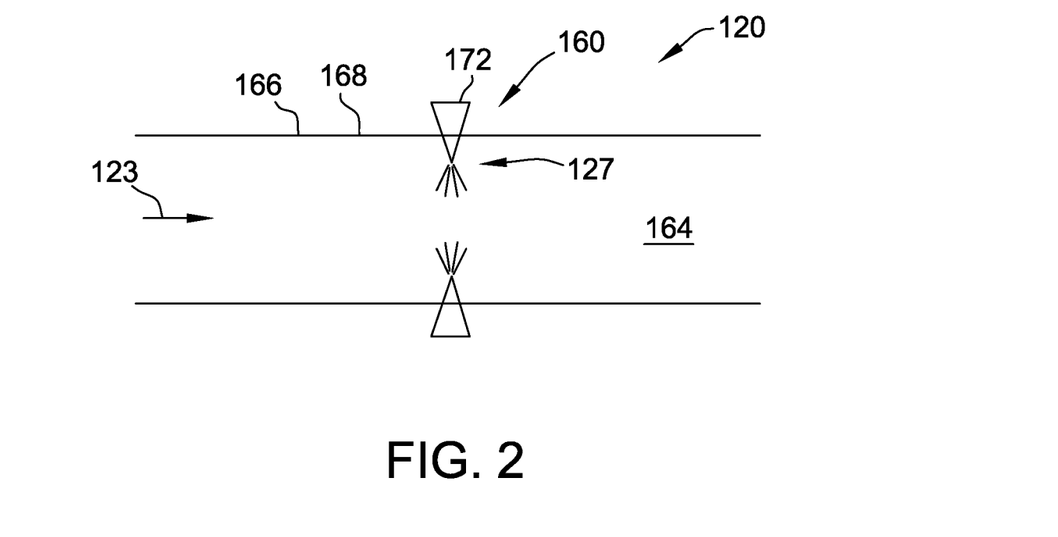
FIG. 2 is a cross-sectional view of an air duct that may be used with the turbine engine assembly shown in FIG. 1 in accordance with a first embodiment of a coupling.
Figure 3:
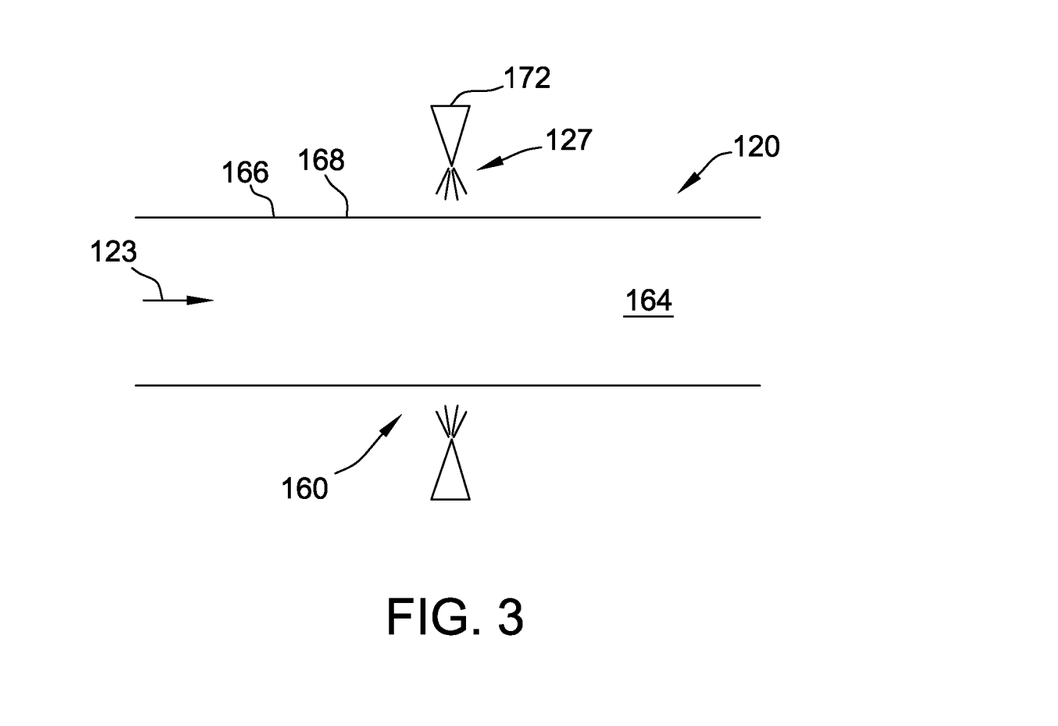
FIG. 3 is a cross-sectional view of an air duct that may be used with the turbine engine assembly shown in FIG. 1 in accordance with a second embodiment of the coupling.
Figure 4:
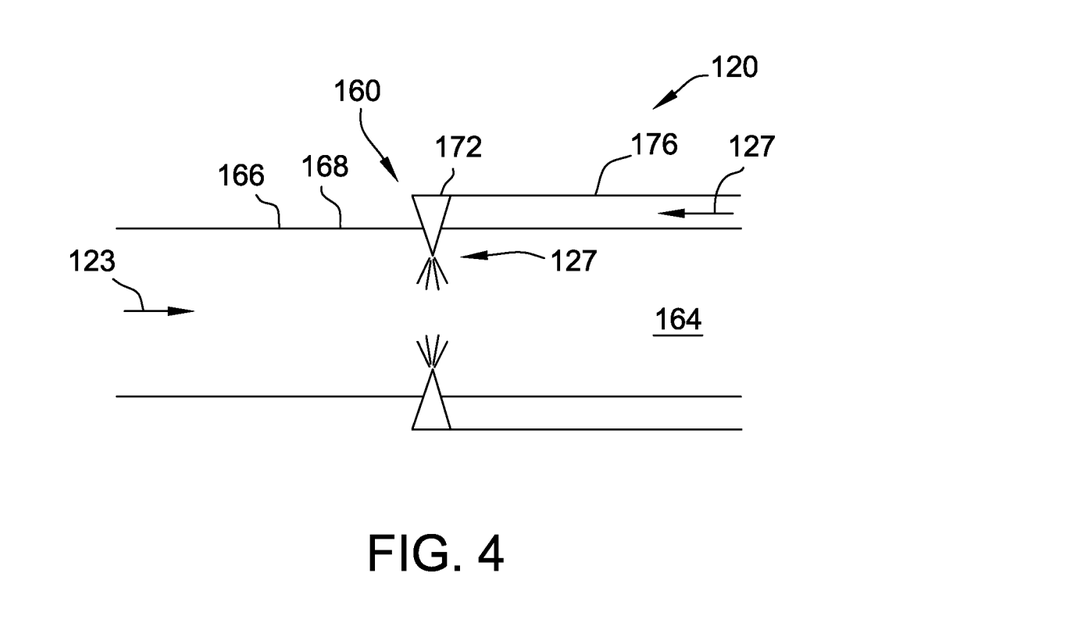
FIG. 4 is a cross-sectional view of an air duct that may be used with the turbine engine assembly shown in FIG. 1 in accordance with a third embodiment of the coupling.

FIGS. 2-4 are cross-sectional views of air duct 120 that may be used with turbine engine assembly 100 (shown in FIG. 1) in accordance with first, second, and third exemplary embodiments of coupling 160. Referring to FIG. 2, air duct 120 includes an interior 164 defined by side walls 166, and side walls 166 include an exterior surface 168. Second portion 123 of CDC air 118 is channeled through interior 164 of air duct 120.

Moreover, coupling 160 includes at least one nozzle 172 for discharging flow of fluid 127 therefrom. More specifically, in the first exemplary embodiment, at least a portion of nozzle 172 extends through side walls 166 of air duct 120 for injecting the flow of fluid 127 into air duct 120. As such, the temperature of second portion 123 of CDC air 118 is modified when the flow of fluid 127 and second portion 123 of CDC air 118 are mixed within air duct 120. In the exemplary embodiment, fluid 127 is liquid water. In alternative embodiments, fluid 127 is any suitable fluid from any suitable source that enables fluid supply system 110 to function as described herein. In the exemplary embodiment in which fluid 127 is liquid water, a heat of vaporization of the liquid water at coupling 160 correspondingly decreases a temperature of second portion 123 of CDC air 118, along with vaporized fluid 127, provided to mid-rotor region 125. In some embodiments, the absorption of heat provided by the phase change enables significant cooling to be achieved with a relatively low flow of fluid 127. Additionally or alternatively, fluid 127 absorbs heat from second portion 123 of CDC air 118 without a phase change.

Referring to FIG. 3, in the second exemplary embodiment, coupling 160 includes the at least one nozzle 172 is positioned a distance from exterior surface 168 of air duct 120. Nozzle 172 discharges the flow of fluid 127 therefrom onto exterior surface 168 of air duct 120. Heat is transferred between the flow of fluid 127 and air duct 120, which facilitates modifying the temperature of second portion 123 of CDC air 118 via the thermal conductivity of side walls 166. Fluid 127 may be liquid water or another suitable fluid as described above.

Referring to FIG. 4, in the third exemplary embodiment, coupling 160 includes an outer jacket 176 extending along and positioned radially outward from side walls 166 of air duct 120. Flow of fluid 127 is channeled through outer jacket 176 prior to being injected into air duct 120. The flow of fluid 127 through outer jacket 176 facilitates cooling air duct 120 and preheating flow of fluid 127 prior to injection when, for example, there is a comparatively extreme temperature difference between the hot components in mid-rotor region 125 and fluid 127 at fluid source 130. As such, the temperature of the flow of fluid 127 is progressively increased as the flow of fluid 127 is channeled from fluid source 130 towards nozzle 172. Fluid 127 again may be liquid water or another suitable fluid as described above.

FIG. 5 is a cross-sectional view of a portion of turbine engine assembly 100 (shown in FIG. 1) illustrating an exemplary embodiment of mid-rotor region 125. In the exemplary embodiment, CDC 180 is defined in downstream flow communication with compressor 104 adjacent to mid-rotor region 125. Mid-rotor region 125 of rotor 113 is defined generally between compressor 104 and turbine 108, radially inward of CDC 180. Air duct 120 is illustrated schematically in flow communication with CDC 180, such that second portion 123 of CDC air 118 is received by air duct 120.

In the exemplary embodiment, air duct 120 includes a first segment 183 and a second segment 184. First segment 183 is positioned radially outward from CDC 180 and is coupled to supply line 132 at coupling 160. First segment 183 extends from a first end 177 to a second end 179, and a path length is defined along first segment 183 from first end 177 to second end 179. CDC 180 has a radius 181 defined with respect to centerline axis 114. In certain embodiments, the path length of first segment 183 is less than about six times radius 181. Moreover, in some such embodiments, the path length of first segment 183 is less than two times radius 181. Thus, in some embodiments, cooling system 101 does not require routing of second portion 123 of CDC air 118 through lengthy tubing to a large-footprint heat exchange system on a separate skid, thereby reducing a cost and footprint, and increasing an operating efficiency, of turbine engine assembly 100, as compared to at least some known turbine engine assemblies. In alternative embodiments, first segment 183 has any suitable path length that enables cooling system 101 to function as described herein.

In the exemplary embodiment, first segment 183 is positioned outside of a casing 186 that defines CDC 180, and first segment 183 receives second portion 123 of CDC air 118 through an extraction port in casing 186. In alternative embodiments, air duct 120 does not include first segment 183. For example, supply line 132 extends into CDC 180 through a port in casing 186, such that coupling 160 is coupled directly to second segment 184 of air duct 120 within CDC 180.

Second segment 184 of air duct 120 extends within CDC 180 along substantially an entire length of second segment 184, and is in flow communication with rotor 113 at mid-rotor region 125. In the exemplary embodiment, second segment 184 receives cooled second portion 123 of CDC air 118 from first segment 183, and channels cooled second portion 123 to mid-rotor region 125. In alternative embodiments, coupling 160 is coupled directly to second segment 184, as described above.

In the exemplary embodiment, second segment 184 is formed within a CDC strut 182 that extends through CDC 180, such that CDC strut 182 spaces casing 186 from rotor 113. For example, second segment 184 of air duct 120 is drilled into CDC strut 182. Thus, in some embodiments, second segment 184 can be formed within a pre-existing turbine engine, and first segment 183, supply line 132, and coupling 160 can be coupled together with second segment 184 to form cooling system 101 without interfering with existing equipment and fixtures associated with turbine engine 102, facilitating a retrofit of a preexisting turbine engine to include cooling system 101. In alternative embodiments, second segment 184 of air duct 120 is defined in any suitable fashion that enables air duct 120 to function as described herein.

In certain embodiments, mid-rotor region 125 is configured to channel a first portion 201 of cooled second portion 123 of CDC air 118 from air duct 120 to a high pressure packing seal 190 positioned in mid-rotor region 125, facilitating cooling of high pressure packing seal 190. Additionally or alternatively, mid-rotor region 125 is configured to channel a second portion 202 of cooled second portion 123 of CDC air 118, in parallel to first portion 201, to at least one seal air passage 192 positioned in mid-rotor region 125. In some such embodiments, the at least one seal air passage 192 is in flow communication with a second packing seal 194, and at least a portion of second portion 202 is channeled to second packing seal 194 to facilitate cooling of second packing seal 194.

With reference to FIGS. 1 and 5, in some embodiments, a size of cooling system 101 is relatively small compared to known heat exchanger systems for similar applications. For example, in certain embodiments, fluid source 130 is facility water, and flow of fluid 127 of less than about 0.5 pounds per second is sufficient to cool components in mid-rotor region 125, such as but not limited to high pressure packing seal 190, the at least one seal air passage 192, and second packing seal 194, by about 100 degrees F. in response to an expected range of high ambient temperature of intake air 112. Flow of fluid 127 of less than about 0.5 pounds per second facilitates use of a correspondingly small valve 126 and supply line 132, which may be easily routed through other equipment adjacent to turbine engine 102. In alternative embodiments, fluid 127 is any suitable fluid, is provided at any suitable flow rate, and/or produces any suitable amount of cooling that enables turbine engine assembly 100 to function as described herein.

In certain embodiments, second portion 123 of CDC air 118 is used to cool other portions of turbine engine 102 in addition to mid-rotor region 125. For example, in some embodiments, mid-rotor region 125 is configured to channel a third portion 203 of cooled second portion 123 of CDC air 118 from air duct 120 to at least one stage 195 of turbine 108, facilitating cooling of a rotor wheel 196 and/or turbine blades 197 coupled circumferentially about rotor wheel 196 of turbine stage 195. For example, in the exemplary embodiment, third portion 203 is channeled, in parallel to first portion 201 and/or second portion 202, to a first stage 195 of turbine 108, facilitating cooling of rotor wheel 196 and/or a root portion of turbine blades 197 coupled thereto.

In some such embodiments, fluid 127 is liquid water, and a flow of fluid 127 of less than about 2.0 pounds per second is sufficient to cool rotor wheel 196 of first stage 195, along with components in mid-rotor region 125, such as but not limited to high pressure packing seal 190, the at least one seal air passage 192, and second packing seal 194, by about 100 degrees F. in response to an expected range of high ambient temperature of intake air 112. Thus, in some such embodiments, cooling system 101 reduces a requirement to cool components of turbine 108 using compressor bleed air 115, in addition to facilitating cooling components of mid-rotor region 125, while maintaining the size and location advantages of cooling system 101 described above. In alternative embodiments, fluid 127 is any suitable fluid, is provided at any suitable flow rate, and/or produces any suitable amount of cooling that enables turbine engine assembly 100 to function as described herein.

Additionally or alternatively, in some such embodiments, flow of fluid 127 facilitates management of a pinch clearance of the at least one stage 195 of turbine 108 during hot restart and/or shut down. In some such embodiments, use of cooling system 101 to manage pinch clearance during hot restart and/or shut down facilitates design of turbine 108 with reduced clearance at steady state, facilitating increased efficiency of turbine engine 102, as compared to a similar turbine engine not having cooling system 101.

Similarly, in certain embodiments, mid-rotor region 125 is configured to channel a fourth portion 204 of cooled second portion 123 of CDC air 118 from air duct 120 to at least one stage 200 of compressor 104, facilitating cooling of a rotor wheel 198 and/or compressor blades 199 coupled circumferentially about rotor wheel 198 of compressor stage 200. For example, in the exemplary embodiment, fourth portion 204 is channeled, in series from second portion 202, to cool rotor wheel 198 and/or compressor blades 199 of a final stage 200 of compressor 104, further facilitating operation of turbine engine 102 with a higher compressor discharge temperature, for example on days when an ambient temperature of intake air 112 is relatively high.

In some embodiments, controller 124 is configured to control the flow of fluid 127 based on at least one operating condition of turbine engine 102. For example, controller 124 is configured to control the flow of fluid 127 during hot restart and/or shut down, as described above. Additionally or alternatively, in some embodiments, controller 124 is configured to control the flow of fluid 127 based at least partially on a temperature of CDC air 118 in CDC 180. For example, controller 124 receives a direct measurement of the temperature of CDC air 118 from a suitable sensor (not shown). For another example, controller 124 receives the temperature of CDC air 118 based on calculations using other measured or operator-input parameters, such as the ambient temperature of intake air 112. In alternative embodiments, controller 124 is configured to control the flow of fluid 127 based on any suitable parameter that enables cooling system 101 to function as described herein.

In some embodiments in which controller 124 is configured to control the flow of fluid 127 based on the temperature of CDC air 118, in response to the temperature of CDC air 118 being below a threshold value, controller 124 controls valve 126 to a closed or zero percent position, such that no flow of fluid 127 is provided to coupling 160 and cooling system 101 provides no cooling to the components in mid-rotor region 125. For example, the threshold value corresponds to base load operation of turbine engine 102 at moderate ambient temperatures of intake air 112. In response to the temperature of CDC air 118 being equal, within a suitable tolerance, to the threshold value, controller 124 controls valve 126 to a half-open or fifty percent position, such that flow of fluid 127 reduces a temperature of second portion 123 of CDC air 118 and, hence, of the components in mid-rotor region 125. Thus, for example, a life cycle of the components in mid-rotor region 125 is increased. In response to the temperature of CDC air 118 being above the threshold value, corresponding for example to operation of turbine engine 102 at relatively high ambient temperatures of intake air 112, controller 124 calculates a ratio of the temperature of CDC air 118 to a maximum allowable compressor discharge temperature, and controls valve 126 to a proportional position between half-open and fully open corresponding to the calculated temperature ratio, such that flow of fluid 127 increases in proportion to a temperature rise of CDC air 118 beyond the threshold temperature.

In some such embodiments, cooling system 101 facilitates operation of turbine engine 102 at, for example, a greater maximum allowable temperature of CDC air 118, as compared to a similar turbine engine not having cooling system 101, with reduced or no lifecycle impact on the components in mid-rotor region 125. Additionally or alternatively, half-open valve 126 in response to the threshold value, in combination with linear compensation for increasing temperature of CDC air 118 above the threshold value, facilitates operation of turbine engine 102 with tighter design clearances between rotating and stationary components, for example at high pressure packing seal 190, as compared to a similar turbine engine not having cooling system 101, thus improving an efficiency of turbine engine 102. In alternative embodiments, controller 124 is configured to control the flow of fluid 127 in response to the measured temperature of CDC air 118 in any suitable fashion that enables cooling system 101 to function as described herein.

In the exemplary embodiment, controller 124 is implemented using one or more electronic computing devices. Such devices typically include at least one processing device (not shown) such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein, including steps that controller 124 is configured to perform, may be encoded as executable instructions embodied in a computer readable medium, including, without limitation, a non-transitory storage device and/or a memory device coupled to the at least one processor. Such instructions, when executed by the controller or processing device, cause the controller or processing device to perform at least some of the method steps described herein. Although controller 124 is illustrated as a discrete system, controller 124 may be implemented at least partially by at least one processor embedded within any component of turbine engine assembly 100. The above examples are exemplary only, and thus are not intended to limit in any way the definition and/or meaning of the terms controller and processing device.

The above-described embodiments overcome at least some disadvantages of known cooling systems for turbine engines. Specifically, the embodiments channel cooled compressor discharge air to components in or adjacent to a mid-rotor region of the turbine engine, facilitating operation of the turbine engine at a higher compressor discharge temperature, for example during hot ambient conditions. Also specifically, in some embodiments, the cooling system does not require routing of the compressor discharge air through lengthy tubing to a large-footprint heat exchange system on a separate skid, thereby reducing a cost and footprint, and increasing an operating efficiency, of the turbine engine. Also specifically, in some embodiments, a flow of fluid used to cool the compressor discharge air is held steady while the compressor discharge air is at a threshold temperature, and increased proportionally to a temperature rise of the compressor discharge air beyond the threshold temperature, facilitating operation of the turbine engine with tighter design clearances between rotating and stationary components, as compared to similar turbine engines not having the cooling system, thus improving an efficiency of the turbine.

The disclosure is not limited to the specific embodiments described herein, but rather, steps of the methods and/or elements of the systems may be utilized independently and separately from other steps and/or elements described herein. For example, the methods and systems are not limited to practice with only a turbine engine as described herein. Rather, the methods and systems may be implemented and utilized in connection with many other applications.

Although specific features of various embodiments may be shown in some drawings and not in others, this is for convenience only. Moreover, references to a particular embodiment in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cooling system for a turbine engine, the turbine engine including a compressor, a compressor discharge chamber (CDC), a combustor assembly, and a turbine coupled in a serial flow relationship such that a first portion of air from the CDC is channeled to the combustor assembly, the turbine coupled to the compressor via a rotor, said cooling system comprising:
   an air duct configured to channel a second portion of air from the CDC to a mid-rotor region of the rotor; and
   a fluid supply system coupled to said air duct at a coupling, said fluid supply system comprising:

a supply line in flow communication with said coupling and configured to channel a flow of fluid to said coupling, said coupling configured to cool the second portion of CDC air via absorption of heat by the fluid from the second portion of CDC air;

a valve operatively coupled to said supply line; and a controller operable, via control of said valve, to control the flow of fluid to said coupling based on at least one operating condition of the turbine engine, the at least one operating condition comprising a temperature of air in the CDC;

wherein said controller is configured such that:

in response to the temperature of CDC air being below a threshold value, said controller controls said valve to a closed position;

in response to the temperature of CDC air being equal, within a suitable tolerance, to the threshold value, said controller controls said valve to a half-open position; and in response to the temperature of CDC air being above the threshold value, said controller calculates a ratio of the temperature of CDC air to a maximum allowable compressor discharge temperature, and controls said valve to a proportional position between half-open and fully open corresponding to the calculated temperature ratio.

2. The cooling system in accordance with claim 1, wherein the CDC has a radius defined with respect to a centerline axis of the turbine engine, and wherein said air duct comprises a first segment positioned radially outward from the CDC, said fluid supply system coupled to said first segment at said coupling, said first segment extending from a first end to a second end and having a path length defined along said first segment from said first end to said second end, said path length being less than about six times the radius.

3. The cooling system in accordance with claim 2, wherein said path length is less than about two times the radius.

4. The cooling system in accordance with claim 2, wherein said air duct further comprises a second segment that extends within the CDC, said second segment configured to receive the cooled second portion of CDC air from said first segment and channel the cooled second portion to the mid-rotor region.

5. The cooling system in accordance with claim 1, wherein said controller is configured to control the flow of fluid to manage a pinch clearance of at least one stage of the turbine engine during one of hot restart and shut down of the turbine engine.

6. A turbine engine assembly comprising:

a compressor, a compressor discharge chamber (CDC), a combustor assembly, and a turbine coupled in a serial flow relationship such that a first portion of air from said CDC is channeled to said combustor assembly, said turbine coupled to said compressor via a rotor;

an air duct comprising a first segment and a second segment, said first segment configured to channel a second portion of air from said CDC to said second segment; and a fluid supply system coupled to said first segment at a coupling, said fluid supply system configured to channel a flow of fluid to said coupling, said coupling configured to cool the second portion of CDC air via absorption of heat by the fluid from the second portion of CDC air, wherein said second segment is configured to channel the cooled second portion of CDC air to a mid-rotor region of said rotor;

a supply line in flow communication with said coupling;

a valve operatively coupled to said supply line; and a controller operable, via control of said valve, to control the flow of fluid to said coupling based on at least one operating condition of said turbine engine assembly, the at least one operating condition comprising a temperature of air in the CDC;

wherein said controller is configured such that:

in response to the temperature of CDC air being below a threshold value, said controller controls said valve to a closed position;

in response to the temperature of CDC air being equal, within a suitable tolerance, to the threshold value, said controller controls said valve to a half-open position; and in response to the temperature of CDC air being above the threshold value, said controller calculates a ratio of the temperature of CDC air to a maximum allowable compressor discharge temperature, and controls said valve to a proportional position between half-open and fully open corresponding to the calculated temperature ratio.

7. The turbine engine assembly in accordance with claim 6, wherein said mid-rotor region is configured to channel a first portion of the cooled second portion of CDC air to a high pressure packing seal positioned in said mid-rotor region.

8. The turbine engine assembly in accordance with claim 7, wherein said mid-rotor region is configured to channel a second portion of the cooled second portion of CDC air, in parallel to the first portion of the cooled second portion, to at least one seal air passage positioned in said mid-rotor region.

9. The turbine engine assembly in accordance with claim 8, wherein said at least one seal air passage is in flow communication with a second packing seal, and at least a portion of the second portion of the cooled second portion is channeled to said second packing seal.

10. The turbine engine assembly in accordance with claim 8, wherein said mid-rotor region is configured to channel, in series with the second portion of the cooled second portion, a fourth portion of the cooled second portion of CDC air to at least one stage of said compressor.

11. The turbine engine assembly in accordance with claim 7, wherein said mid-rotor region is configured to channel, in parallel to the first portion of the cooled second portion, a third portion of the cooled second portion of CDC air to at least one stage of said turbine.

12. The turbine engine assembly in accordance with claim 6, wherein said CDC has a radius defined with respect to a centerline axis of said rotor, and wherein said first segment extends from a first end to a second end and has a path length defined along said first segment from said first end to said second end, said path length is less than about six times the radius.

13. The turbine engine assembly in accordance with claim 12, wherein said path length is less than about two times the radius.

14. The turbine engine assembly in accordance with claim 6, wherein said controller is configured to control the flow of fluid to manage a pinch clearance of at least one stage of said turbine during one of hot restart and shut down of said turbine engine assembly.

* * * * *